(12) United States Patent
Nagatani et al.

(10) Patent No.: US 7,232,372 B2
(45) Date of Patent: *Jun. 19, 2007

(54) TRIPOD CONSTANT VELOCITY UNIVERSAL JOINT

(75) Inventors: Haruo Nagatani, Shizuoka (JP); Tatsuro Sugiyama, Shizuoka (JP); Fumihiro Isobe, Shizuoka (JP)

(73) Assignee: NTN Corporation, Osaka (JP)

( * ) Notice: Subject to any disclaimer, the term of this patent is extended or adjusted under 35 U.S.C. 154(b) by 212 days.

This patent is subject to a terminal disclaimer.

(21) Appl. No.: 10/493,547

(22) PCT Filed: Aug. 8, 2002

(86) PCT No.: PCT/JP02/08147

§ 371 (c)(1),
(2), (4) Date: Apr. 22, 2004

(87) PCT Pub. No.: WO03/036115

PCT Pub. Date: May 1, 2003

(65) Prior Publication Data

US 2004/0248656 A1 Dec. 9, 2004

(30) Foreign Application Priority Data

Oct. 26, 2001 (JP) ............................. 2001-329380

(51) Int. Cl.
*F16D 3/205* (2006.01)
(52) U.S. Cl. ..................................... 464/111; 464/905
(58) Field of Classification Search ................ 464/111, 464/120–124, 132, 905; *F61D 3/205*
See application file for complete search history.

(56) References Cited

U.S. PATENT DOCUMENTS

| | | | |
|---|---|---|---|
| 4,741,723 A | 5/1988 | Orain | |
| 4,828,534 A * | 5/1989 | Orain | 464/111 |
| 5,254,038 A | 10/1993 | Schneider | |
| 6,736,730 B2 * | 5/2004 | Sugiyama et al. | 464/111 |
| 6,843,728 B2 * | 1/2005 | Sugiyama et al. | 464/111 |

FOREIGN PATENT DOCUMENTS

| | | | |
|---|---|---|---|
| EP | 202968 | | 11/1986 |
| JP | 59-040016 | | 3/1984 |
| JP | 61-290234 | | 12/1986 |
| JP | 64-5164 | | 1/1989 |
| JP | 2001-234941 | | 8/2001 |
| JP | 2005-140278 | * | 6/2005 |
| WO | 92/15797 | | 9/1992 |

* cited by examiner

*Primary Examiner*—Greg Binda
(74) *Attorney, Agent, or Firm*—Wenderoth, Lind & Ponack, L.L.P.

(57) ABSTRACT

A tripod type constant-velocity universal joint includes an outer ring having three axially-extending track grooves in its inner periphery, a tripod member mounted in the outer ring and having three trunnions extending into the track grooves, and guide blocks supported on the trunnions in the track grooves, respectively. Rolling elements are disposed in raceway grooves on opposite sides of each guide block between the guide block and the outer ring. The rolling elements are retained by retainers and a moving amount restricting mechanism restricts the moving amount of the retainers to half the moving amount of the guide blocks. Each retainer has retaining plate portions retaining the rolling elements on each side of the guide block, and a plate portion coupling together the retaining plate portions. Each restricting mechanism includes a lever pivotably supported on the plate portion and having guide grooves into which protrusions are slidably fitted.

9 Claims, 12 Drawing Sheets

Induced thrust
T=294N·m, N=150rpm

Slide resistance
T=196N·m, ±0.25mm/20Hz

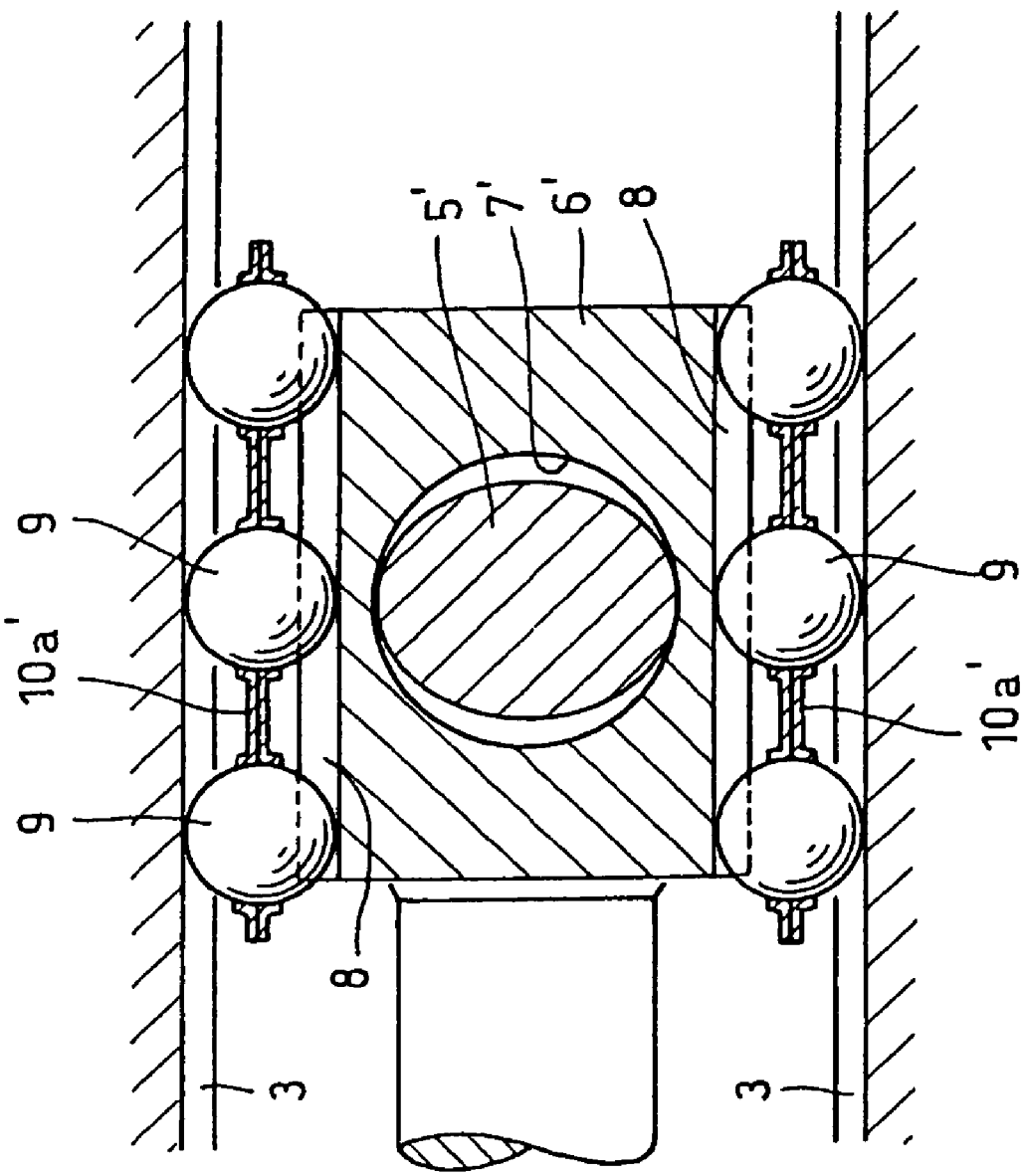

TRIPOD CONSTANT VELOCITY UNIVERSAL JOINT

TECHNICAL FIELD

This invention relates to a tripod type constant-velocity universal joint for transmitting torque between an outer ring having three track grooves in its inner periphery and a tripod member mounted therein.

BACKGROUND ART

A tripod type constant-velocity universal joint is heretofore known in which three axially extending track grooves are formed in the inner periphery of an outer ring, a pair of circumferentially opposed roller guide surfaces are formed for each track groove, three trunnions are provided on a tripod member mounted in the outer ring at positions corresponding to the track grooves, and spherical rollers rotatably supported by the respective trunnions are arranged in the track grooves to transmit torque between the outer ring and the tripod member at the engaging portions between the spherical rollers and the roller guide surfaces of the track grooves.

In this tripod type constant-velocity universal joint, when torque is transmitted with the outer ring and tripod member forming a working angle, the center of rotation of each spherical roller is inclined relative to the longitudinal direction of the corresponding track groove, so that due to the inclination, the spherical rollers do not make a pure rolling motion but relative slip occurs between the spherical rollers and the roller guide surfaces of the track grooves.

Thus, the frictional resistance at the contact portions between the spherical rollers and the roller guide surfaces increases, so that the sliding resistance is large while the outer ring and the tripod member are moving axially relative to each other. Vibration and noise thus develop, thus lowering the NVH (noise, vibration and harshness) characteristics.

In order to improve the NVH characteristics, in the tripod type constant-velocity universal joint described in JP patent publication 64-5164, axially extending raceway grooves are formed in circumferentially opposed sides of the track grooves formed in the outer ring, raceway grooves are formed in both sides of guide blocks relatively pivotally supported in the moving direction of the tripod member by the trunnions of the tripod member, and a plurality of balls are mounted between the former grooves and the latter grooves to transmit torque between the outer ring and the tripod member through the balls.

In this tripod type constant-velocity universal joint, even when the outer ring and the tripod member form a working angle, the guide blocks are held in a constant position by the balls disposed between the raceway grooves of the guide blocks and the raceway grooves of the outer ring. Thus, during relative axial movement between the outer ring and the tripod member, the balls roll with no vibration or noise produced. Thus, it has good NVH characteristics.

In the tripod type constant-velocity universal joint described in the above publication, it is necessary to provide portions for preventing the balls from coming out at both ends of the raceway grooves of the guide blocks. Thus, if the working angle between the outer ring and the tripod member increases, the balls may touch these portions, and cannot smoothly roll. The balls thus slip, so that in such a slip area, the NVH characteristics tend to worsen.

In order to solve this problem, in the constant-velocity universal joint described in JP patent publication 4-74565, a plurality of balls mounted between the raceway grooves of the guide blocks and the raceway grooves on both sides of the outer ring track grooves are retained by retainers, and the moving amount of each retainer is restricted to half the moving amount of the guide block by a moving amount restricting means so that the balls always roll.

In the tripod type constant-velocity universal joint described in JP patent publication 4-74565, since the moving amount restricting means for restricting the moving amount of the retainers have such a structure that a pinion is mounted to each retainer, and racks that mesh with the pinion are mounted to the outer ring and each guide block, the mechanism is complicated. Also, since a space for mounting the pinion and the pair of racks is needed between both sides of each guide block and the sides of the corresponding track groove, the constant-velocity universal joint becomes large.

An object of this invention is to simplify the structure and reduce the size of a tripod type constant-velocity universal joint in which the rolling elements for transmitting torque such as balls are retained by retainers, and the moving amount of the retainers are restricted to half the moving amount of the guide blocks.

SUMMARY OF THE INVENTION

In order to attain this object, in the first embodiment, there is provided a tripod type constant-velocity universal joint wherein three track grooves extending in the axial direction of an outer ring are formed in the inner periphery of the outer ring, straight raceway grooves that extend in the axial direction of the outer ring are formed in a pair of circumferentially opposed sides of each track groove, three trunnions are provided on a tripod member mounted in the outer ring at positions corresponding to the track grooves, a guide block supported on each trunnion so as to pivotable in the moving direction of said tripod member relative thereto is received in each track groove, raceway grooves that oppose the raceway grooves are formed on both sides of each guide block, a plurality of rolling elements are mounted between the opposed raceway grooves, and moving amount restricting mechanisms are provided for restricting the moving amount of retainers which retain the plurality of rolling elements to half the moving amount of the guide blocks. The retainers each have retaining plate portions provided on both sides of a plate portion arranged between an inner surface of the outer wall of each track groove and each guide block for retaining the plurality of rolling elements. Each moving amount restricting mechanism comprises inclined grooves formed in the inner surface of the outer wall of each track groove, inclined grooves formed in the outer surface of each guide block and inclined in opposite directions to the inclined grooves, guide grooves elongated in a direction perpendicular to the moving direction of the retainers, and balls received in cross portions of the inclined grooves of the outer ring and the inclined grooves of the guide blocks so as to be movable along the guide grooves.

As described above, by supporting the balls received in the crossing portions between the inclined grooves of the outer ring and the inclined grooves of the guide blocks so as to be movable in the direction perpendicular to the moving direction of the retainers by the plate portions of the retain ers, it is possible to restrict the moving amount of the retainers to half the moving amount of the guide blocks, so that the rolling elements, which roll in contact with the raceway grooves, can undergo a rolling motion over the entire slide region.

Also, since it is necessary to provide only a small space for mounting the plate portion of each retainer and the balls between the inner surface of the outer wall of each outer ring track groove and the outer surface of each guide block, compared with a constant-velocity universal joint in which a moving amount restricting mechanism comprising a pinion and a pair of racks is mounted, it is possible to reduce the size of the constant-velocity universal joint.

In order to solve the above object, according to a second embodiment, there is provided a tripod type constant-velocity universal joint wherein three track grooves extending in the axial direction of an outer ring are formed in the inner periphery of the outer ring, straight raceway grooves that extend in the axial direction of the outer ring are formed in a pair of circumferentially opposed sides of each track groove, three trunnions are provided on a tripod member mounted in the outer ring at positions corresponding to the track grooves, a guide block supported on each trunnion so as to pivotable in the moving direction of the tripod member relative thereto is received in each track groove, raceway grooves that oppose the raceway grooves are formed on both sides of each guide block, a plurality of rolling elements are mounted between the opposed raceway grooves, and moving amount restricting mechanism are provided for restricting the moving amount of retainers which retain the plurality of rolling elements to half the moving amount of the guide blocks. The retainers each have retaining plate portions provided on both sides of a plate portion arranged between an inner surface of the outer wall of each track groove and each guide block for retaining the plurality of rolling elements. Each moving amount restricting mechanism comprises a pivotable lever having its center pivotably supported on plate portion of each retainer and having at both ends thereof guide grooves elongated toward both ends, and a pair of protrusions each inserted in one of the guide grooves. One of the protrusions is fixed to the inner surface of the outer wall of each track groove, and the other of the protrusions is fixed to the outer surface of each guide block. The distances between the respective protrusions and the pivot center of the lever are equal.

Also in the second embodiment, too, since the ratio between the distance from each protrusion at the outer ring side to the pivot center of each lever, which is supported on the plate portion of the retainer, and the distance from each protrusion at the outer ring side to the protrusion on each guide block is 1:2, the moving amount of the retainers can be restricted to half the moving amount of the guide blocks.

Also, since it is a simple structure in which each lever is pivotally supported by the plate portion of the retainer, and one of the pair of protrusions inserted in the guide grooves formed at both ends of each lever is provided on the outer ring, and the other protrusion on the guide block, it is possible to reduce the size of the constant-velocity universal joint without the need to provide a large mounting space between the inner surface of the outer wall of each track groove and the outer surface of each guide block.

Here, by forming the levers in the shape of flat plates, they can be easily formed by pressing. Each of the flat plate-shaped levers may be pivotally supported by providing it on the outer surface of the plate portion of the retainer. Otherwise, it may be pivotally supported by providing it on the inner surface of the plate portion. If the lever is provided on the outer surface of the plate portion, a cutout is formed in the guide portion to receive the protrusion on the guide block, and if the lever is provided on the inner surface of the plate portion, a cutout is formed in the plate portion to receive the protrusion on the outer ring so that the guide blocks and retainers are movable relative to each other.

In supporting the guide blocks of the tripod type constant-velocity joint according to this invention, it is possible to employ a method in which a spherical surface is provided on each trunnion, each trunnion being inserted in a hole formed in each guide block, or a method in which the trunnions have an oval section of which the major axis is perpendicular to the moving direction of the guide blocks, each trunnion being inserted each in a hole formed in each guide block.

In order to stabilize the positions of the guide blocks, the number of the rolling elements under loads in a torque-transmitting state in which the outer ring and the tripod member take a maximum working angle is two or more. By using balls as the rolling elements, it is possible to reduce the moving resistance during the movement of the guide blocks to an extremely small value, so that it is possible to smoothly move the guide blocks.

BRIEF DESCRIPTION OF THE DRAWINGS

FIG. 13 is a cross-sectional plan view showing another example of support of a guide block.

DETAILED DESCRIPTION OF THE INVENTION

Figure 1:
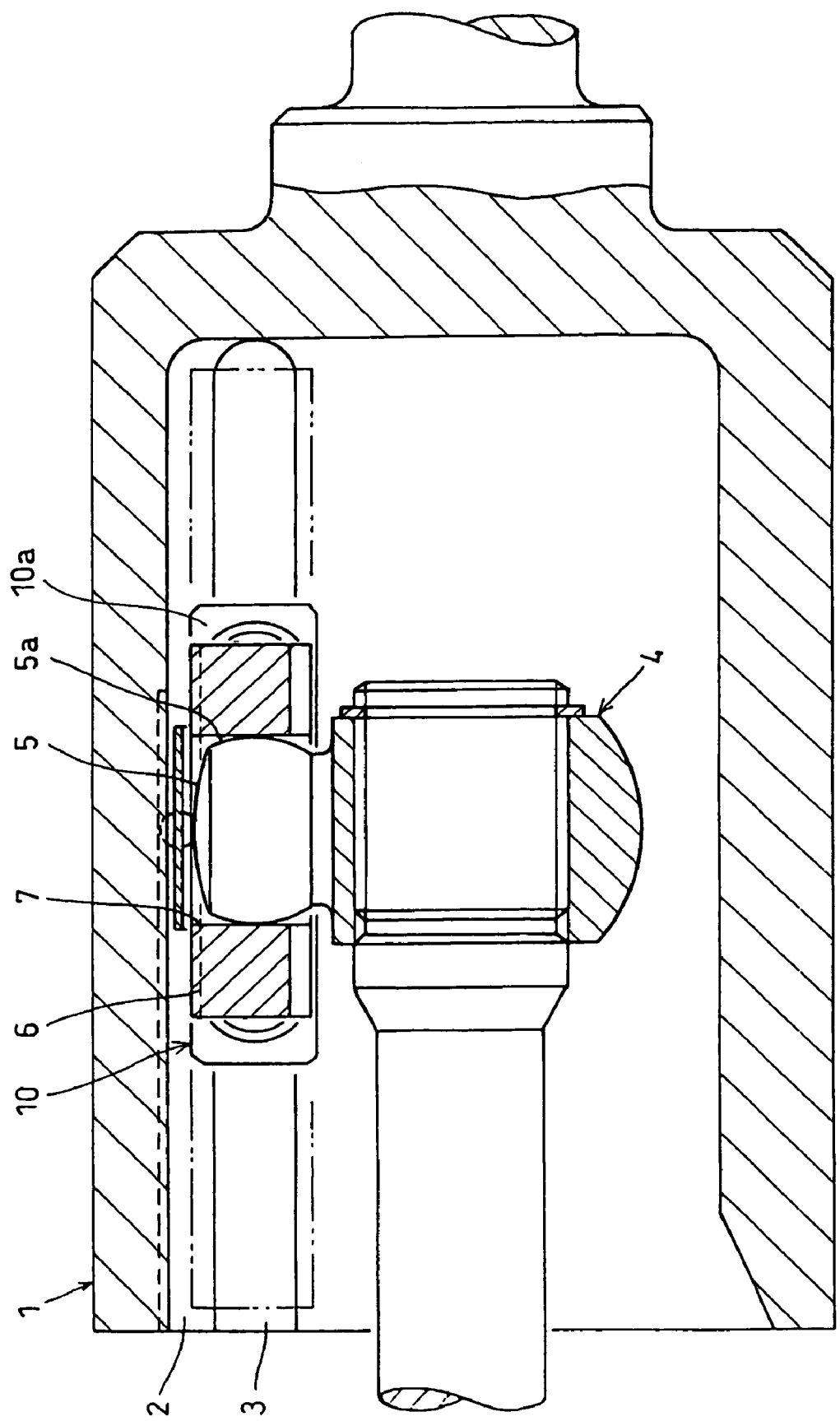
FIG. 1 is a vertical sectional front view of a tripod type constant-velocity universal joint according to this invention.
Figure 2:
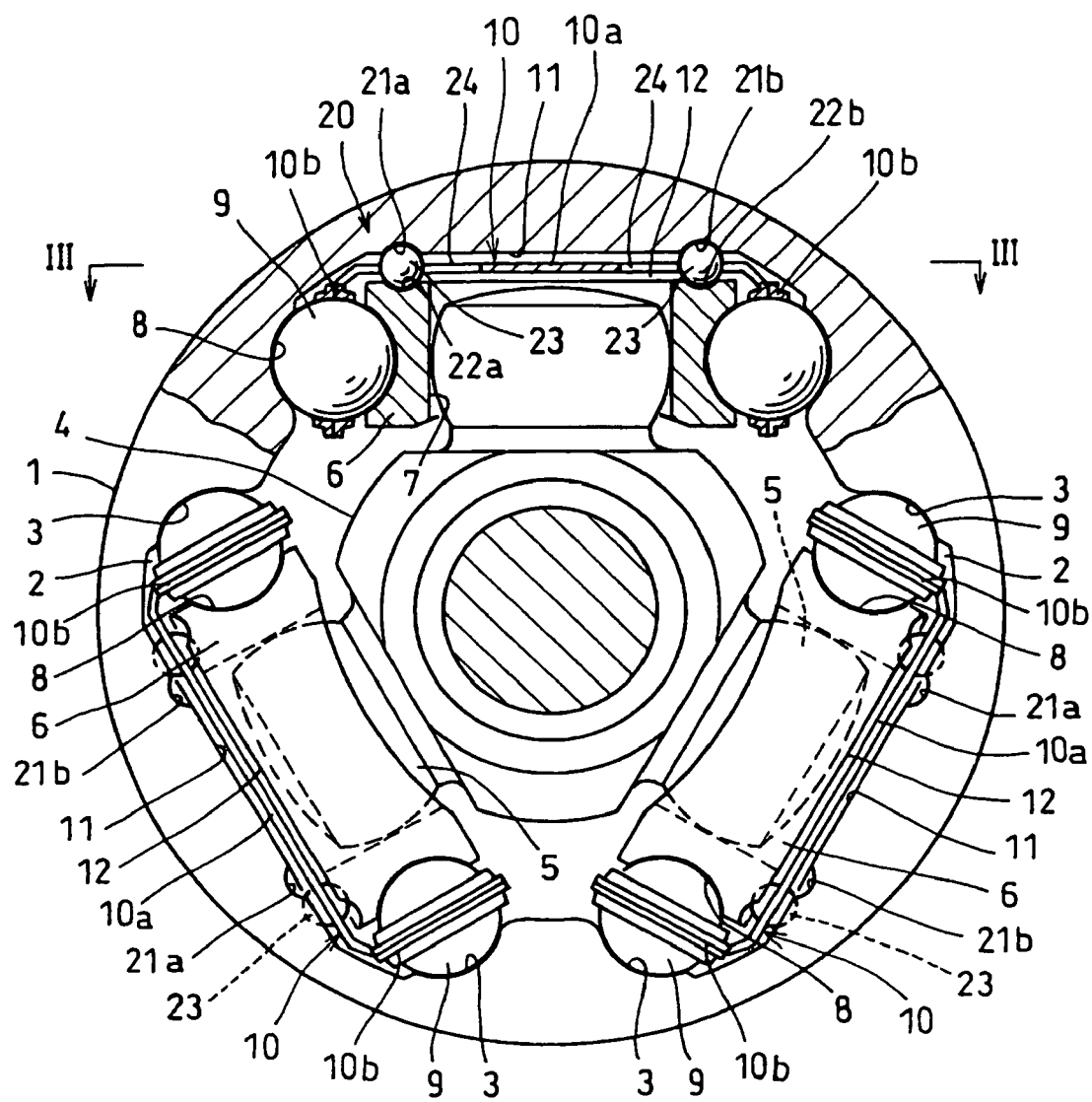
FIG. 2 is a partially cutaway side view of FIG. 1.

Hereinbelow, embodiments of this invention will be described with reference to the drawings. As shown in FIGS. 1 and 2, three axially extending track grooves 2 are formed in the inner periphery of an outer ring 1 at intervals of 120 degrees. Axially extending raceway grooves 3 are formed in a pair of sides of each track groove 2 that oppose each other in the circumferential direction of the outer ring.

A tripod member 4 mounted in the outer ring 1 has three trunnions 5 at positions opposite to the track grooves 2, respectively. A guide block 6 is supported by each trunnion 5. In order to support the guide blocks 6, a spherical surface 5a is formed on each trunnion 5, and each trunnion 5 is inserted in a cylindrical hole 7 formed in each guide block 6, so that the trunnions 5 can pivot in any direction relative to the guide blocks 6.

On both sides of each guide block 6, a pair of raceway grooves 8 opposing the raceway grooves 3 on both sides of each outer ring track groove 2 are formed, and rolling elements 9 comprising a plurality of balls are mounted between the opposed raceway grooves 3 and 8.

On both sides of the guide blocks 6, the plurality of rolling elements 9, which are arranged in the axial direction of the outer ring 1, are retained by retainers 10. The retainers 10 each have retaining plate portions 10b, for retaining the plurality of rolling elements 9, arranged at both sides of the respective guide block, on both sides of a plate portion 10a arranged between the inner surface 11 of the outer wall of the respective track groove 2 and the outer surface 12 of the respective guide block 6.

As described above, by mounting the plurality of rolling elements 9 between the raceway grooves 3, which are formed on both sides of each of the track grooves 2, and the raceway grooves 8, which are formed on both sides of each of the guide blocks 6, it is possible to always retain the positions of the guide blocks 6 constantly. When the outer ring 1 and the tripod member 4 take a working angle, slip occurs at contact portions between the spherical outer surfaces 5a of the trunnions 5 and the cylindrical holes 7 of the guide blocks 6, so that the trunnions 5 incline relative to the axes of the cylindrical holes 7 of the guide blocks 6.

Thus, when torque is transmitted with the outer ring 1 and the tripod member 4 taking a working angle, the guide blocks 6 move in the axial direction of the outer ring along the track grooves 2 while keeping their positions constant.

Also, when the outer ring 1 and the tripod member 4 move in the axial direction relative to each other while taking a working angle, the guide blocks 6 move in the axial direction of the outer ring along the track grooves 2.

During movement of the guide blocks 6, since the rolling elements 9 move while rolling due to contact with the raceway grooves 3 and 8, the moving resistance of the guide blocks 6 is extremely small. Thus, the guide blocks 6 slide smoothly, so that they will scarcely produce vibration during sliding.

The moving amount of the rolling elements 9 during sliding of the guide blocks 6 is half the moving amount of the guide blocks 6 if the slippage at the contact portions with the raceway grooves 3 and 8 is ignored. If a difference develops in the moving amount between the rolling elements 9 and the retainers 10, the rolling elements 9 slip, so that vibration is produced.

Also, if the retainers 10, which retain the rolling elements 9, are simply mounted between the sides of the track grooves 2 and the sides of the guide blocks 6, due to slippage at the contact portions between the rolling elements 9 and the raceway grooves 3 and 8, or due to vibration of the vehicle on which is mounted the constant-velocity universal joint, there is a concern that the retainers 10 may shift in the axial direction and fall from their intended location.

In order for the rolling elements to purely roll, and in order to prevent them from coming out of the raceway grooves 3 and 8, the moving amount of the retainers 10 is restricted to half the moving amount of the guide blocks by a moving amount restricting mechanism 20.

Figure 3:
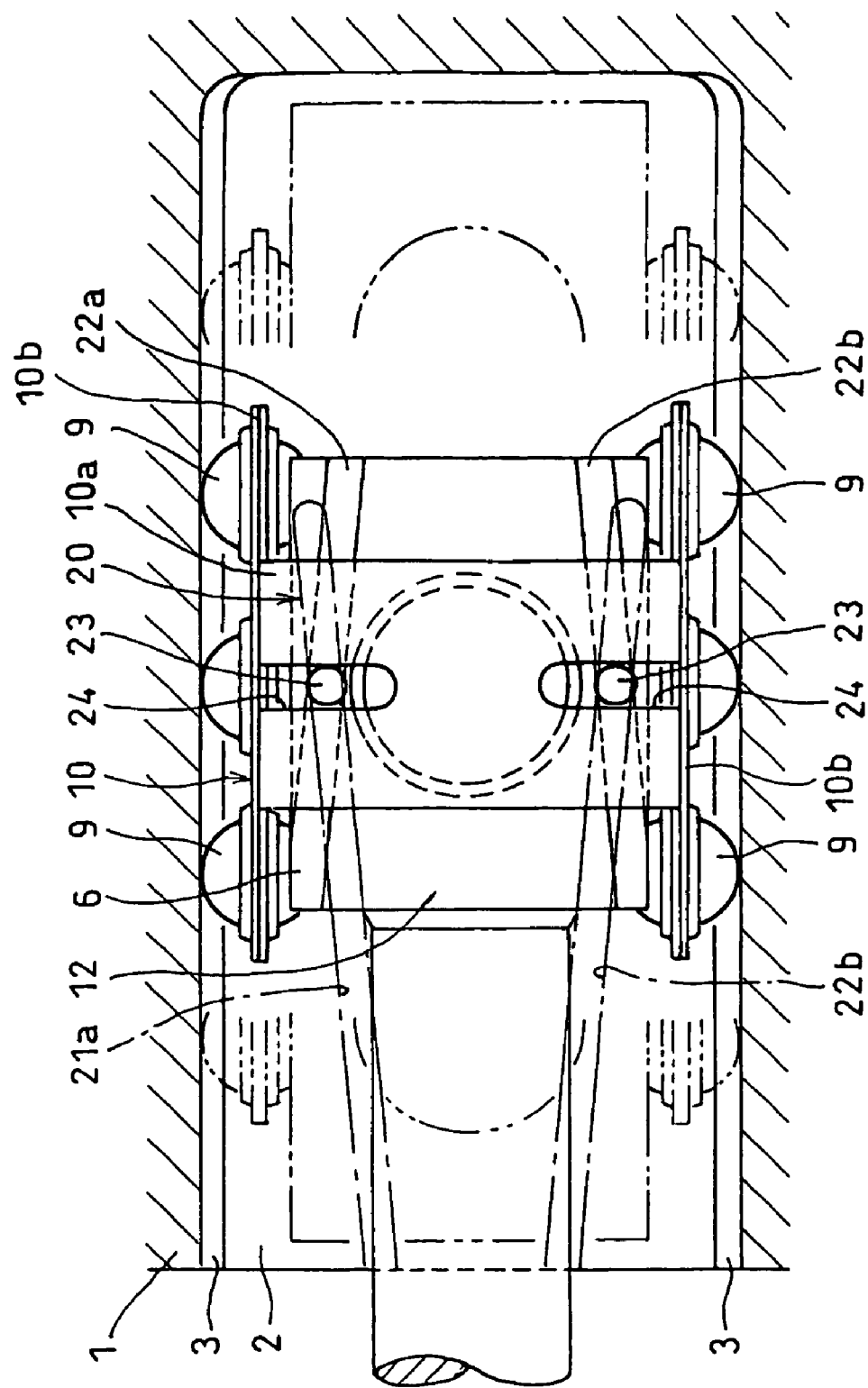
FIG. 3 is a sectional view along line III—III of FIG. 2.
Figure 4:
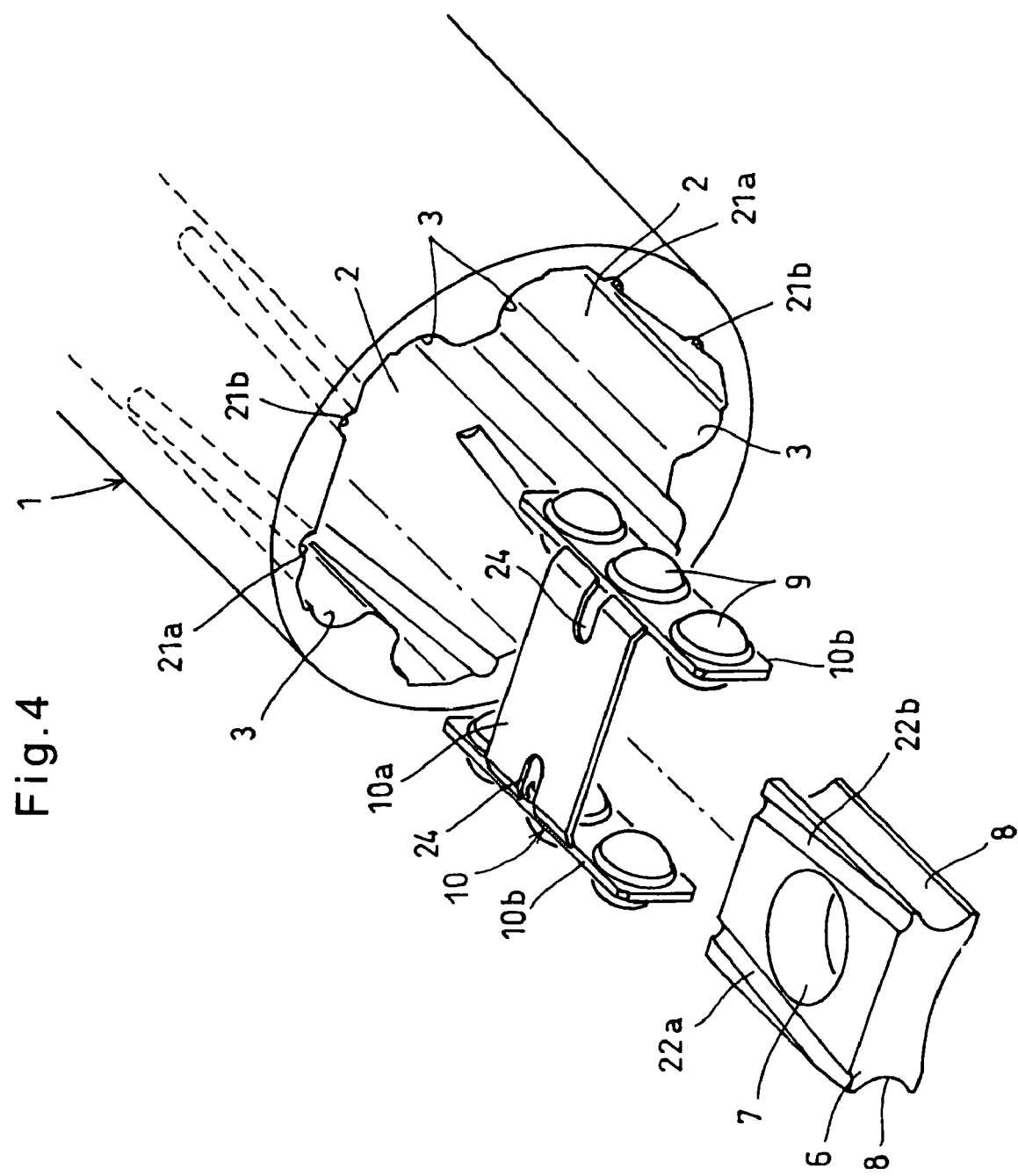
FIG. 4 is an exploded perspective view showing an outer ring, a retainer and a guide block.

As shown in FIGS. 2 through 4, as the moving amount restricting mechanism 20, on both sides of the inner surface 11 of the outer wall of the outer ring track grooves 2, a pair of inclined grooves 21a, 21b that are elongated in the axial direction of the outer ring and inclined in opposite directions relative to each other are formed, and on the outer sides of the guide blocks 6, at positions opposite the inclined grooves 21a, 21b, a pair of inclined grooves 22a, 22b inclined in opposite directions to the respective inclined grooves 21a, 21b are formed. At crossing portions of the inclined grooves 21a, 21b of the outer ring and the inclined grooves 22a, 22b of the guide blocks 6, balls 23 are housed and supported with a pair of guide grooves 24 formed on both sides of the plate portion 10a of the retainers 10. Here, the guide grooves 24 are elongated in the direction perpendicular to the moving direction of the retainers 10. The balls 23 can move along the guide grooves 24.

Figure 5A:
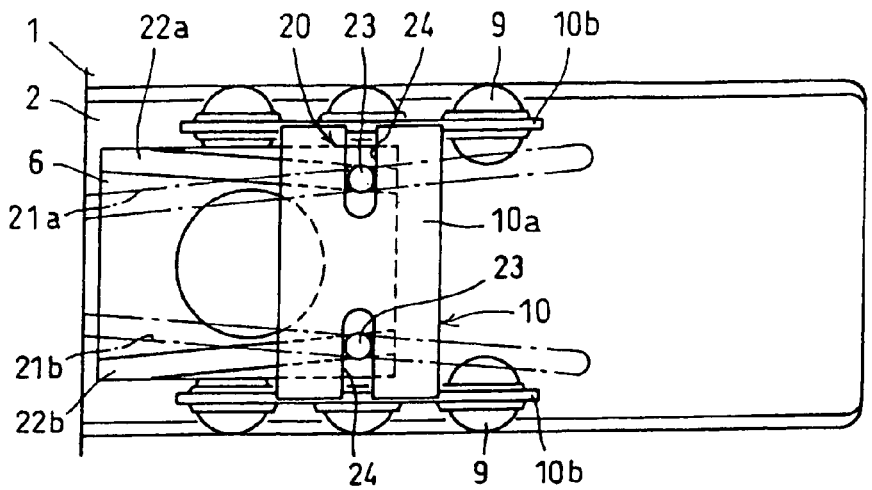
FIGS. 5A through 5C are plan views showing moving states of the guide block stepwise.
Figure 5B:
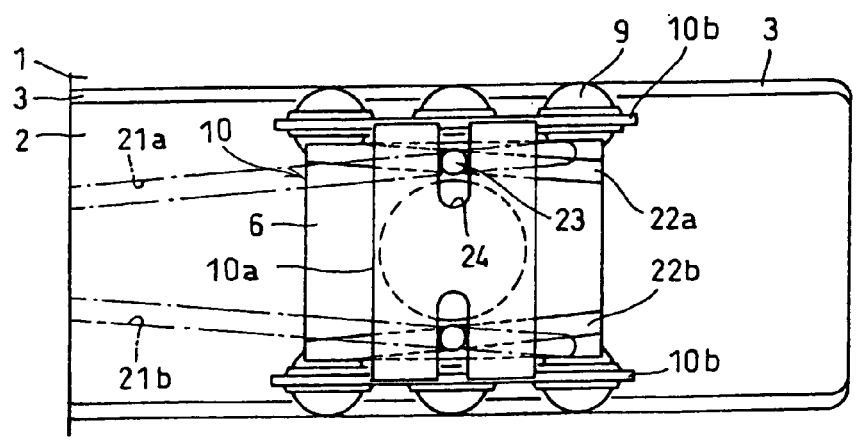
Figure 5C:
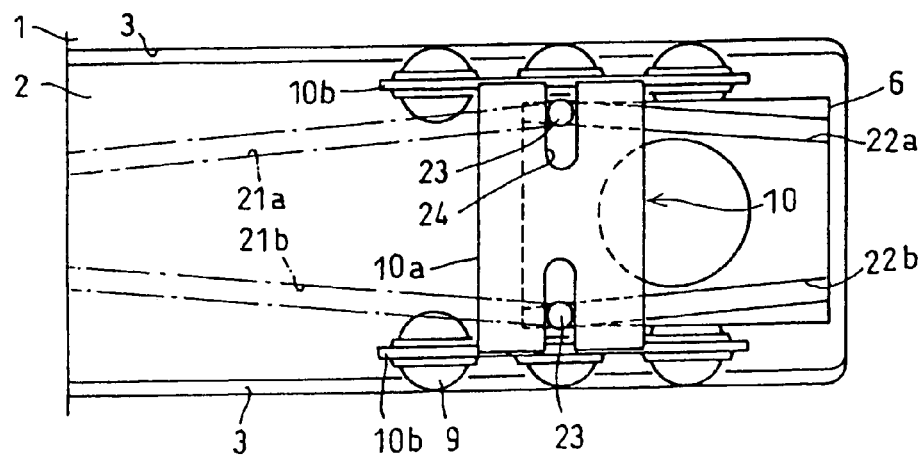

As described above, by providing the inclined grooves 21a, 21b, 22b and 22b on the inner surface 11 of the outer walls of the track grooves 2 and the outer surfaces 12 of the guide blocks 6 so as to incline in opposite directions relative to each other, and supporting the balls 23, which are housed in the cross portions of the inclined grooves 21a, 21b, 22a, 22b, in the guide grooves 24, which are formed in the plate portions 10a, so as to be movable in the direction perpendicular to the moving direction of the retainers 10, when the guide blocks 6 move from the state shown in FIG. 5A to the state shown in FIG. 5B along the track grooves 2, the balls 23 move half the moving amount of the guide blocks 6 due to contact with the inclined grooves 21a, 21b, 22a, 22b. Thus, the retainers 10 also move half the moving distance of the guide blocks, so that their moving distance can be made equal to the moving distance of the rolling elements 9, which move by rolling in contact with the raceway grooves 3 and 8.

Thus, the rolling elements 9, which are under loads, are always in a rolling state, so that it is possible to obtain good NVH characteristics over the entire slide region.

Also, since it is only necessary to provide a space in which the plate portion 10a of each retainer 10 and the balls 23 can be housed, between the inner surface 11 of the outer wall of the track grooves 2 and the outer surface of the guide blocks 6, it is possible to prevent the size of the outer ring 1 from becoming too large, so that it is possible to obtain a small constant-velocity universal joint.

FIGS. 6 and 7A–7C show another example of the moving amount restricting mechanism for restricting the moving amount of the retainers 10. In this moving amount restricting mechanism 20', the longitudinal central portion of a lever 25 having a pair of lever pieces 25a, 25b coupled by a pin 26 is pivotally supported by the plate portion 10a of each retainer 10, with one lever piece 25a arranged on the outer side of the plate portion 10a, and the other lever piece 25b arranged on the inner side of the plate portion 10a. Longitudinally extending guide grooves 27 are formed at the tips of the respective lever pieces 25a and 25b, and one of protrusions 28a, 28b comprising a pair of pins inserted in the respective guide grooves 27 is fixed to the outer wall of each track groove 2 and the other to each guide block 6 so that the distances 11 and 12 from the respective protrusions 28a, 28b to the pivot center of the lever 25 will be equal to each other.

Figure 7A:
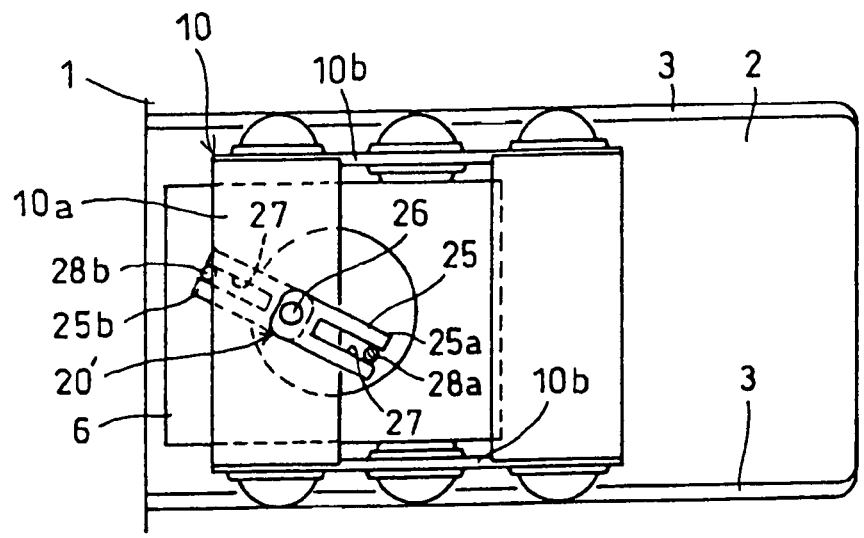
FIGS. 7A through 7C are plan views showing the moving states of the guide block shown in FIG. 6.
Figure 7B:
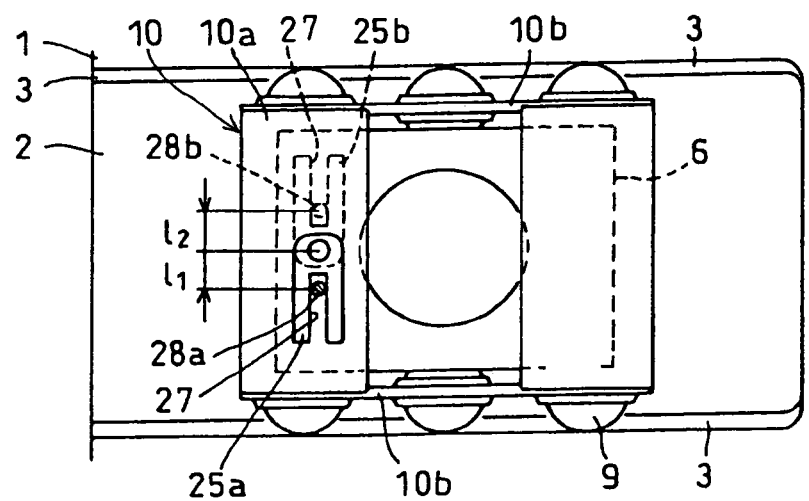
Figure 7C:
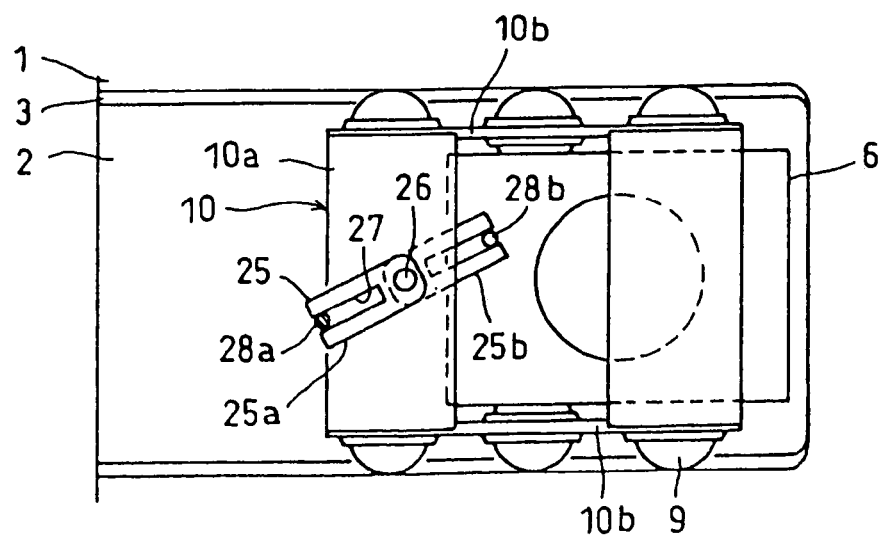

In the moving amount restricting mechanism 20' having this structure, since the ratio of the distance from the protrusions 28a at the outer ring side to the pivot center of the levers 25 to the distance from the protrusions 28a at the outer ring side to the protrusions 28b at the guide block side is 1:2, when the guide blocks 6 move from the state shown in FIG. 7A to the state shown in FIG. 7C, the retainers 10 move half the moving amount of the guide blocks 6, so that the moving amount of the retainer 10 will be equal to the moving amount of the rolling elements 9, which move by contact with the raceway grooves 3 and 8.

Thus, in this example, too, the rolling elements 9, which are under loads, are always in a rolling state, so that it is possible to obtain good NVH characteristics over the entire slide region.

Also, since it is only necessary to provide a space in which a lever 25 and the plate portion 10*a* of a retainer 10 can be housed, between the inner surface 11 of the outer wall of each track groove 2 and the outer surface 12 of each guide block 6, it is possible to prevent the size of the outer ring 1 from increasing, so that it is possible to provide a small constant-velocity universal joint.

Figure 6:
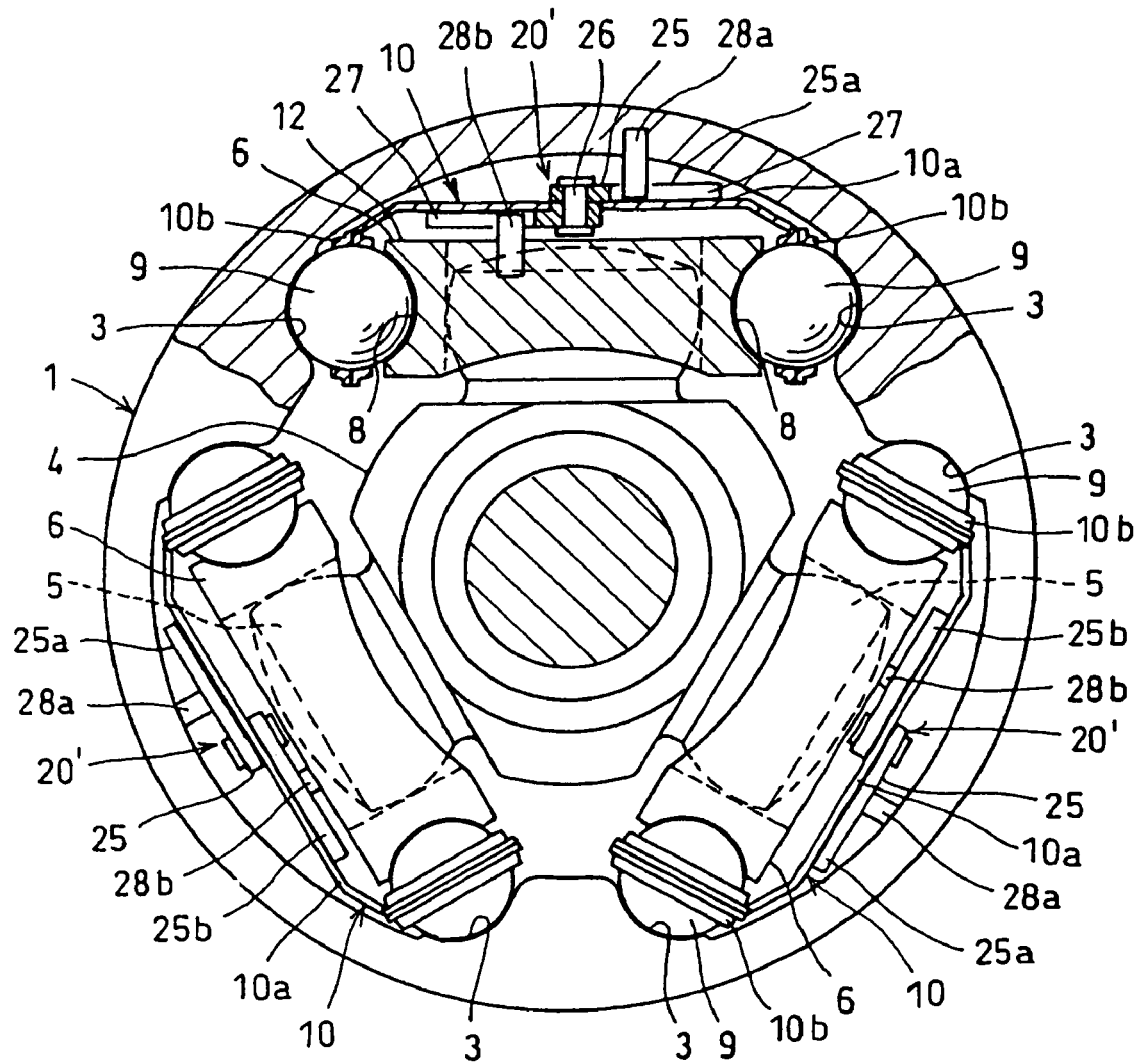
FIG. 6 is a partially cutaway side view showing another embodiment of the tripod type constant-velocity universal joint according to this invention.
Figure 8A:
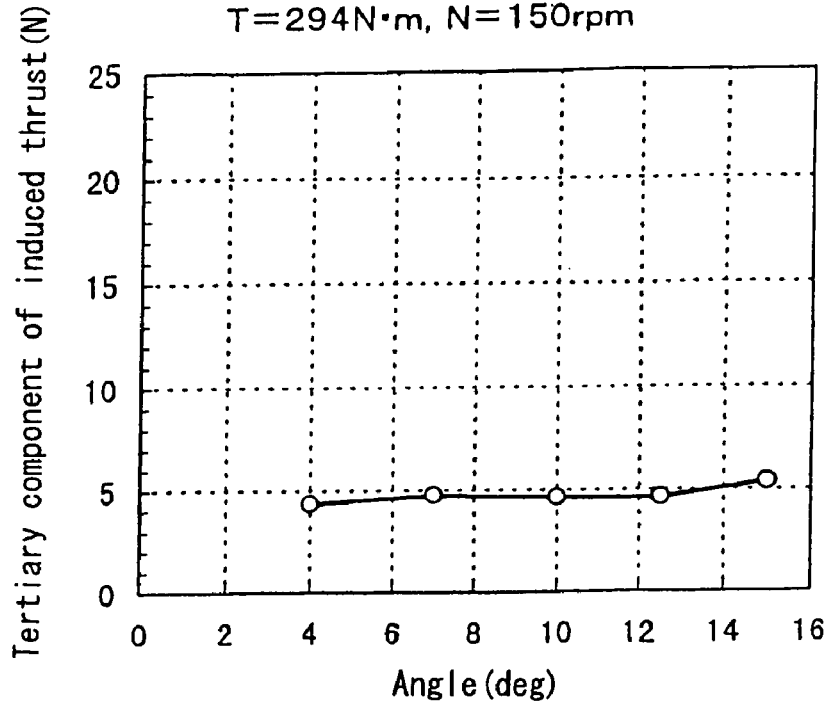
FIG. 8A is a graph showing the test results of a tertiary component of induced thrust in the tripod type constant-velocity universal joint shown in FIG. 6.
Figure 8B:
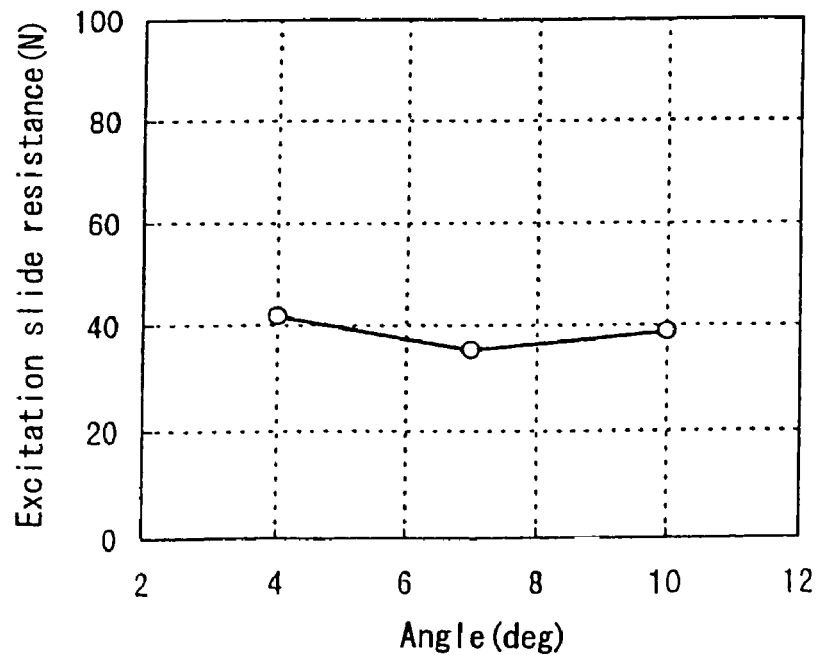
FIG. 8B is a graph showing the test results about oscillating slide resistance.

When, in order to learn the NVH characteristics of the tripod type constant-velocity universal joint shown in FIG. 6, induced thrust and slide resistance tests were conducted, the results shown in FIGS. 8A and 8B were obtained.

In conducting the induced thrust test, with the turning torque T of the tripod type constant-velocity universal joint shown in FIG. 6 set at T=294 N·m and the number of revolutions N at N=150 rpm, the induced thrust tertiary component was measured while changing the angle of the tripod member 4 relative to the outer ring 1.

On the other hand, in conducting the slide resistance test, with the turning torque T of the tripod type constant-velocity universal joint set at T=196 N·m and with the tripod member 4 reciprocated in the axial direction by ±0.25 mm per 20 Hz, the oscillating slide resistance was measured while changing the angle of the tripod member 4 relative to the outer ring 1.

From the above test results, it can be understood that the induced thrust tertiary component and the oscillating slide resistance are extremely small.

Figure 9:
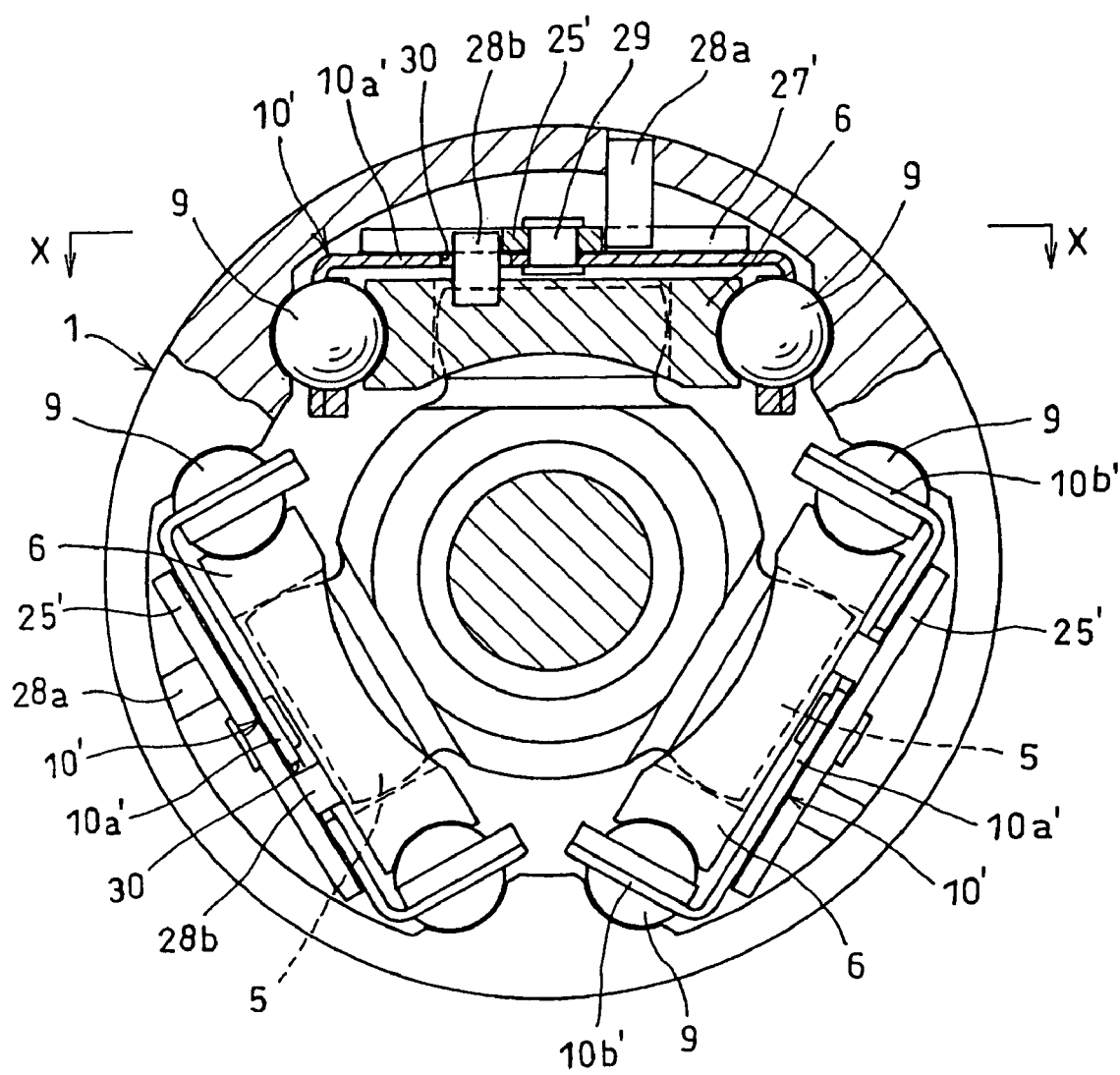
FIG. 9 is a partially cutaway side view showing another embodiment of the tripod type constant-velocity universal joint according to this invention.
Figure 10:
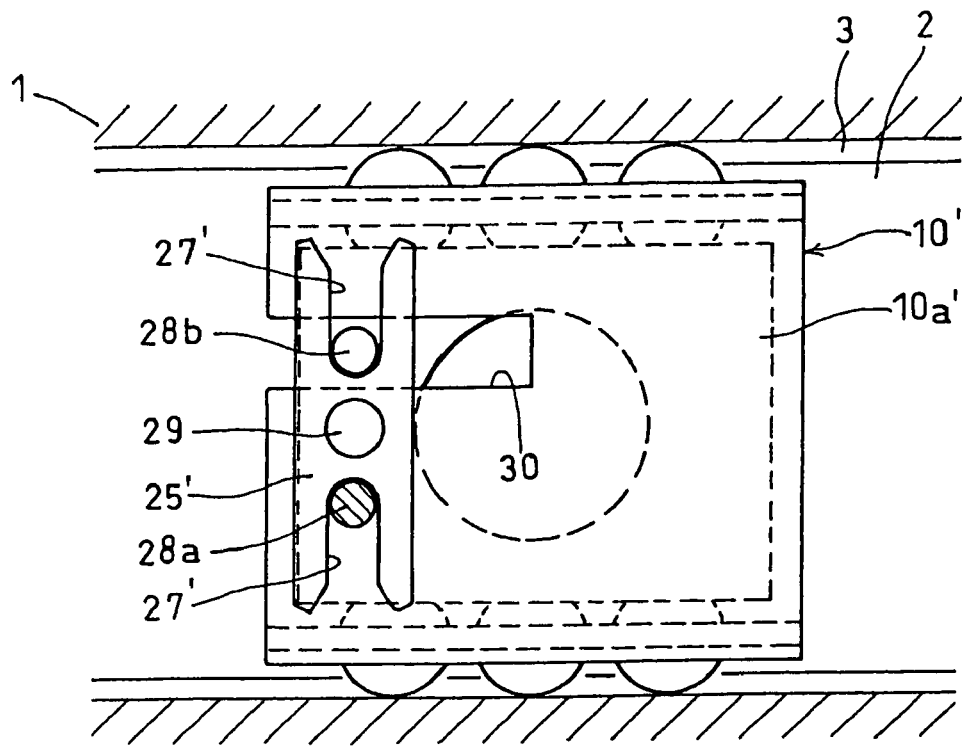
FIG. 10 is a sectional view along line X—X of FIG. 9.

FIGS. 9 and 10 show another example of the lever forming the moving amount restricting mechanism 20'. In this example, the lever 25' is flat plate-shaped so that it can be formed by pressing.

In FIGS. 9 and 10, a flat plate-shaped lever 25' is provided on the outer side of the plate portion 10*a'* of each retainer 10', and by caulking an end of a pin 29 with a head such as a rivet which extends through both of the longitudinal central portion of the lever 25' and the plate portion 10*a'*, the lever 25' is pivotally supported, and the lever 25' is coupled to the retainer 10'. A protrusion 28*a* mounted on the outer ring 1 and comprising a pin, and a protrusion 28*b* mounted on the guide block 6 are inserted in guide grooves 27' formed at both ends of the lever 25'. By forming a cutout 30 in which the protrusion 28*b* on the guide block 6 is inserted in the plate portion 10*a'* of the retainer 10', the guide block 6 and the retainer 10' are movable relative to each other.

By forming the levers 25' in the shape of flat plates, the levers 25' can be formed by pressing, so that they can be formed easily.

Also, by coupling the retainer 10' and the lever 25' by caulking the pin 29, the tripod type constant-velocity universal joint can be assembled more easily compared with the case in which the retainer and the lever are otherwise coupled together.

Figure 12A:
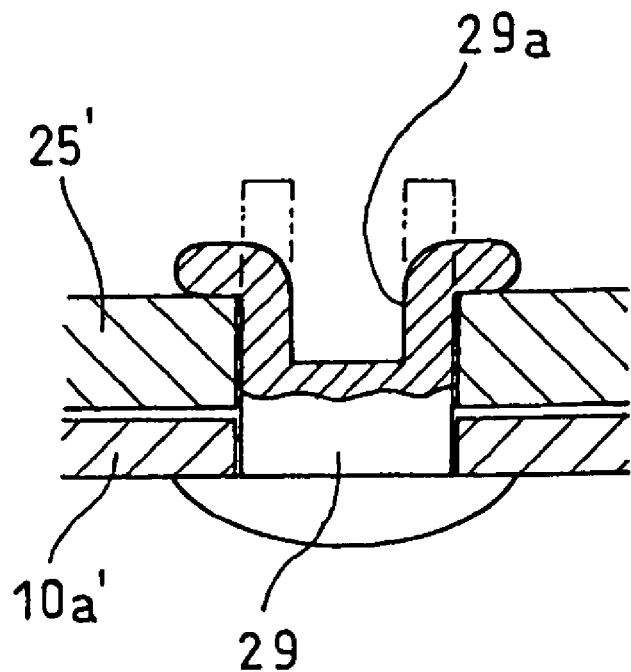
FIGS. 12A and 12B are sectional views showing examples of caulking of pins.
Figure 12B:
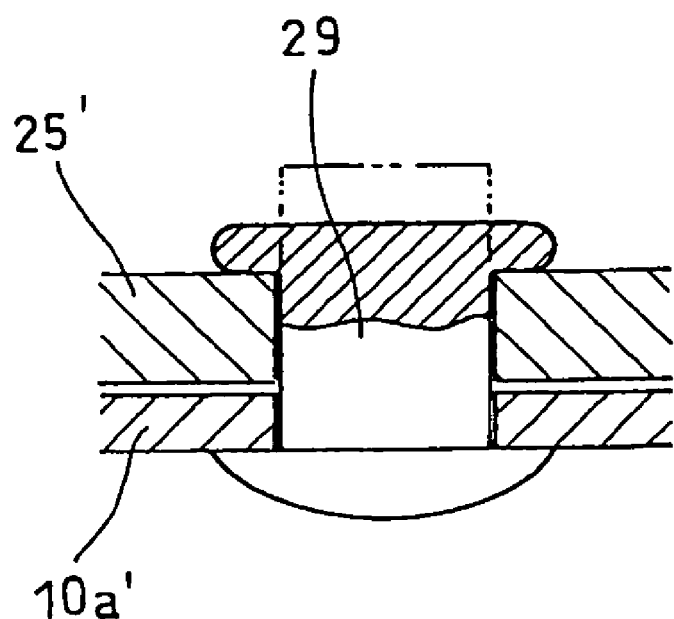

The pin 29 for coupling the retainer 10' and the lever 25' may have a hole 29*a* at its tip as shown in FIG. 12A. Otherwise, as shown in FIG. 12B, it may be one not formed with a hole. In the case of the pin 29 having the hole 29*a*, the end is caulked in the hole 29*a*. On the other hand, in the case of the pin 29 having no hole, the pin is caulked over the entire tip thereof.

Figure 11:
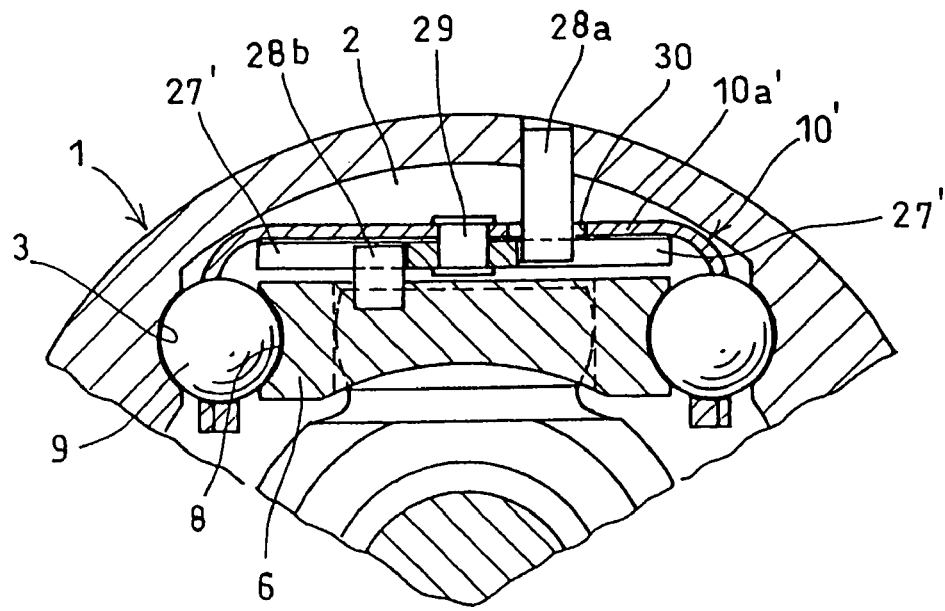
FIG. 11 is a sectional view showing still another embodiment of the tripod type constant-velocity universal joint according to this invention.

In FIGS. 9 and 10, the flat plate-shaped lever 25' is provided on the outer surface of the plate portion 10*a'* of the retainer 10'. But as shown in FIG. 11, it may be provided on the inner surface of the plate portion 10'. In this case, in the plate portion 10*a'*, a cutout 30 in which is inserted a pin 28*a* on the outer ring 1 is formed so that the guide block 6 and the retainer 10' are movable relative to each other.

The constant-velocity universal joint in any of the examples of FIGS. 2, 6, 9 and 11, the number of rolling elements 9 that are under loads with the outer ring 1 and the tripod member 4 taking the maximum working angle is two or more to stabilize the position of the guide blocks 6.

FIG. 13 shows another example of support of a guide block 6. In this example, the trunnion 5' has a sectional shape of an oval of which the major axis is perpendicular to the moving direction of the guide block 6. The trunnion 5' is inserted in a hole 7' formed in the guide block 6.

As described above, by forming the trunnion 5' in an oval shape, the guide block 6 can be pivoted only in the moving direction. Also, since the contact between the trunnion 5' and the hole 7' is a point contact, it is possible to smoothly pivot the guide block 6 and the trunnion 5' relative to each other.

INDUSTRIAL APPLICATION

As described above, in this invention, the moving amount of the retainers can be half the moving amount of the guide blocks, so that the rolling elements, which roll due to contact with the raceway grooves, can roll over the entire slide region. Thus, it is possible to prevent lowering of the NVH characteristics.

Also, since the moving amount restricting mechanisms for restricting the moving amount of the retainers are of a simple structure comprising inclined grooves and balls, or levers and pins, each moving amount restricting mechanism can be mounted in a small space formed between the outer ring and each guide block, so that the outer ring need not be increased in diameter to accommodate the moving amount restricting mechanisms.

The invention claimed is:

1. A tripod type constant-velocity universal joint comprising: an outer ring formed with three axially extending track grooves in an inner periphery thereof; a tripod member mounted in said outer ring and having three trunnions formed thereon so as to oppose said track grooves, raceway grooves being formed in side faces of each of said track grooves and opposing each other in the circumferential direction of said outer ring, said raceway grooves extending in the axial direction of said outer ring; guide blocks respectively supported on said trunnions so as to be pivotable relative to said trunnions and respectively received in said track grooves, each of said guide blocks being formed with raceway grooves in side faces thereof so as to face said raceway grooves of said outer ring to thereby form a plurality of raceway groove pairs; a plurality of rolling elements mounted in said plurality of raceway groove pairs; retainers for retaining said rolling elements; and moving distance restricting mechanisms for restricting the moving distances of said retainers to half of the moving distances of said guide blocks, respectively;

wherein said retainers respectively have plate portions disposed between the inner surfaces of said track grooves and the outer surfaces of said guide blocks, and wherein each of said moving distance restricting mechanisms comprises a pivotable lever having its longitudinally central portion constituting a pivot center pivotably supported by said plate portion of said retainer, said pivotable lever being formed with a pair of guide grooves extending axially, and a pair of protrusions inserted in said guide grooves, one of said pair of protrusions being secured to said outer ring and the other being secured to a respective one of said guide blocks, the distances between said pivot center and said protrusions being equal; and wherein, for each of said moving distance restricting mechanisms, said lever is flat plate-shaped, said flat plate-shaped lever being pivotally supported and arranged on the outer surface or inner surface of said plate portion of each said retainer, and in said plate portion, a cutout is formed so as to permit relative movement of one of said protrusions and said retainer.

2. A tripod type constant-velocity universal joint as claimed in claim 1, wherein a spherical surface is formed on each said trunnion, each said trunnion being inserted in a cylindrical hole formed in each said guide block to support said trunnions and said guide blocks so as to be pivotable relative to each other.

3. A tripod type constant-velocity universal joint as claimed in claim 1, wherein each said trunnion has an oval section of which the major axis is perpendicular to a moving direction of said guide blocks, each said trunnion each being inserted in a hole formed in each said guide block to support said trunnions and the guide blocks so as to be pivotable relative to each other.

4. A tripod type constant-velocity universal joint as claimed in claim 1, wherein the number of said rolling elements under loads in a torque-transmitting state in which said outer ring and said tripod member take a maximum working angle is two or more.

5. A tripod type constant-velocity universal joint as claimed in claim 1, wherein said rolling elements comprise balls.

6. A tripod type constant-velocity universal joint comprising: an outer ring formed with three axially extending track grooves in an inner periphery thereof; a tripod member mounted in said outer ring and having three trunnions formed thereon so as to oppose said track grooves, raceway grooves being formed in side faces of each of said track grooves and opposing each other in the circumferential direction of said outer ring, said raceway grooves extending in the axial direction of said outer ring; guide blocks respectively supported on said trunnions so as to be pivotable relative to said trunnions and respectively received in said track grooves, each of said guide blocks being formed with raceway grooves in side faces thereof so as to face said raceway grooves of said outer ring to thereby form a plurality of raceway groove pairs; a plurality of rolling elements mounted in said plurality of raceway groove pairs; retainers for retaining said rolling elements; and moving distance restricting mechanisms for restricting the moving distances of said retainers to half of the moving distances of said guide blocks, respectively;

wherein said retainers respectively have plate portions disposed between the inner surfaces of said track grooves and the outer surfaces of said guide blocks, and wherein each of said moving distance restricting mechanisms comprises a pivotable lever having its longitudinally central portion constituting a pivot center pivotably supported by said plate portion of said retainer, said pivotable lever being formed with a pair of guide grooves extending axially, and a pair of protrusions inserted in said guide grooves, one of said pair of protrusions being secured to said outer ring and the other being secured to a respective one of said guide blocks, the distances between said pivot center and said protrusions being equal; and wherein a spherical surface is formed on each said trunnion, each said trunnion being inserted in a cylindrical hole formed in each said guide block to support said trunnions and said guide blocks so as to be pivotable relative to each other.

7. A tripod type constant-velocity universal joint comprising: an outer ring formed with three axially extending track grooves in an inner periphery thereof; a tripod member mounted in said outer ring and having three trunnions formed thereon so as to oppose said track grooves, raceway grooves being formed in side faces of each of said track grooves and opposing each other in the circumferential direction of said outer ring, said raceway grooves extending in the axial direction of said outer ring; guide blocks respectively supported on said trunnions so as to be pivotable relative to said trunnions and respectively received in said track grooves, each of said guide blocks being formed with raceway grooves in side faces thereof so as to face said raceway grooves of said outer ring to thereby form a plurality of raceway groove pairs; a plurality of rolling elements mounted in said plurality of raceway groove pairs; retainers for retaining said rolling elements; and moving distance restricting mechanisms for restricting the moving distances of said retainers to half of the moving distances of said guide blocks, respectively;

wherein said retainers respectively have plate portions disposed between the inner surfaces of said track grooves and the outer surfaces of said guide blocks, and wherein each of said moving distance restricting mechanisms comprises a pivotable lever having its longitudinally central portion constituting a pivot center pivotably supported by said plate portion of said retainer, said pivotable lever being formed with a pair of guide grooves extending axially, and a pair of protrusions inserted in said guide grooves, one of said pair of protrusions being secured to said outer ring and the other being secured to a respective one of said guide blocks, the distances between said pivot center and said protrusions being equal; and wherein each said trunnion has an oval section of which the major axis is perpendicular to a moving direction of said guide blocks, each said trunnion each being inserted in a hole formed in each said guide block to support said trunnions and the guide blocks so as to be pivotable relative to each other.

8. A tripod type constant-velocity universal joint comprising: an outer ring formed with three axially extending track grooves in an inner periphery thereof; a tripod member mounted in said outer ring and having three trunnions formed thereon so as to oppose said track grooves, raceway grooves being formed in side faces of each of said track grooves and opposing each other in the circumferential direction of said outer ring, said raceway grooves extending in the axial direction of said outer ring; guide blocks respectively supported on said trunnions so as to be pivotable relative to said trunnions and respectively received in said track grooves, each of said guide blocks being formed with raceway grooves in side faces thereof so as to face said raceway grooves of said outer ring to thereby form a plurality of raceway groove pairs; a plurality of rolling elements mounted in said plurality of raceway groove pairs; retainers for retaining said rolling elements; and moving distance restricting mechanisms for restricting the moving distances of said retainers to half of the moving distances of said guide blocks, respectively;

wherein said retainers respectively have plate portions disposed between the inner surfaces of said track grooves and the outer surfaces of said guide blocks, and wherein each of said moving distance restricting mechanisms comprises a pivotable lever having its longitudinally central portion constituting a pivot center pivotably supported by said plate portion of said retainer, said pivotable lever being formed with a pair of guide grooves extending axially, and a pair of protrusions inserted in said guide grooves, one of said pair of protrusions being secured to said outer ring and the other being secured to a respective one of said guide blocks, the distances between said pivot center and said protrusions being equal; and wherein the number of said rolling elements under loads in a torque-transmitting state in which said outer ring and said tripod member take a maximum working angle is two or more.

9. A tripod type constant-velocity universal joint comprising: an outer ring formed with three axially extending track grooves in an inner periphery thereof; a tripod member mounted in said outer ring and having three trunnions formed thereon so as to oppose said track grooves, raceway grooves being formed in side faces of each of said track grooves and opposing each other in the circumferential direction of said outer ring, said raceway grooves extending in the axial direction of said outer ring; guide blocks respectively supported on said trunnions so as to be pivotable relative to said trunnions and respectively received in said track grooves, each of said guide blocks being formed with raceway grooves in side faces thereof so as to face said raceway grooves of said outer ring to thereby form a plurality of raceway groove pairs; a plurality of rolling elements mounted in said plurality of raceway groove pairs; retainers for retaining said rolling elements; and moving distance restricting mechanisms for restricting the moving distances of said retainers to half of the moving distances of said guide blocks, respectively;

wherein said retainers respectively have plate portions disposed between the inner surfaces of said track grooves and the outer surfaces of said guide blocks, and wherein each of said moving distance restricting mechanisms comprises a pivotable lever having its longitudinally central portion constituting a pivot center pivotably supported by said plate portion of said retainer, said pivotable lever being formed with a pair of guide grooves extending axially, and a pair of protrusions inserted in said guide grooves, one of said pair of protrusions being secured to said outer ring and the other being secured to a respective one of said guide blocks, the distances between said pivot center and said protrusions being equal; and wherein said rolling elements comprise balls.

* * * * *